L. O. CHRISTMANN.
GOVERNOR.
APPLICATION FILED MAY 14, 1920.
1,407,126. Patented Feb. 21, 1922.
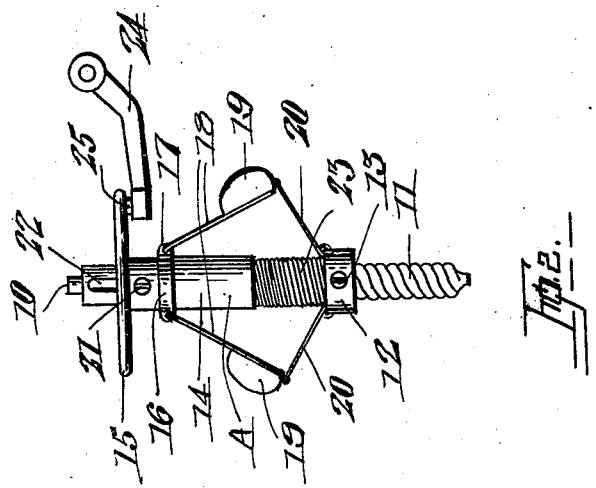
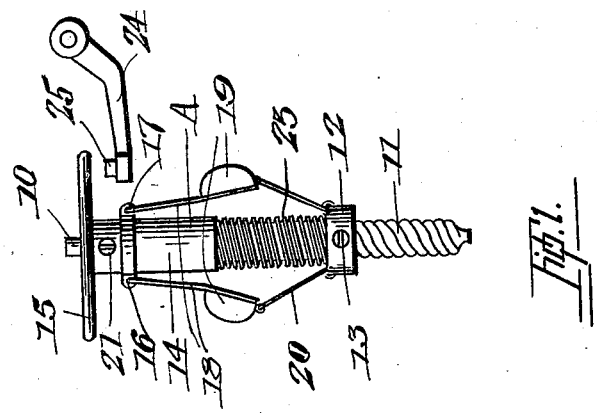
INVENTOR
LEOPOLD.O.CHRISTMANN

UNITED STATES PATENT OFFICE.

LEOPOLD OTTO CHRISTMANN, OF BEACHBURG, ONTARIO, CANADA.

GOVERNOR.

1,407,126.   Specification of Letters Patent.   Patented Feb. 21, 1922.

Application filed May 14, 1920. Serial No. 381,365.

*To all whom it may concern:*

Be it known that I, LEOPOLD OTTO CHRISTMANN, a subject of the King of Great Britain, a resident of the town of Beachburg, Province of Ontario, Dominion of Canada, have invented certain new and useful Improvements in Governors, of which the following is a specification.

This invention relates to improvements in governors designed for use on sound reproducing machines and other forms of machines, and the objects of the invention are to render the governor sensitive, so that it will act quickly and apply a brake force to the motor, to simplify the construction and render the several parts readily accessible for inspection and generally to adapt the governor to better perform the functions required of it.

With the above and other objects in view, the invention consists essentially of the improved construction particularly described and set forth in the following specification and accompanying drawings forming part of the same.

In the drawings:

Figure 1 is a side elevation of the improved governor.

Figure 2 is a side elevation of the improved governor as seen in a different position and when applying a brake force to the motor.

Like characters of reference refer to like parts in the several figures.

Referring to the drawings: A represents the improved governor comprising a spindle 10 having a worm 11 on the lower end which is designed to mesh with a worm wheel not shown, the said worm wheel being rotated from a suitable motor.

A collar 12 is secured by a set screw 13 or the like to the spindle 10 and a sleeve 14 is slidably mounted on the spindle 10 and provided on the upper end with a brake disc 15.

Intermediate of the length of the sleeve 14 a collar 16 is attached and provided with lugs 17 from which the arms 18 are hinged, the said arms being connected at the lower end to balls 19 which are further attached by arms or links 20 to the collar 12.

A set screw 21 extends through the sleeve 14 and slidably engages the slot 22 which extends longitudinally of the spindle 10 so that on rotation of the said spindle the sleeve 14 will also be rotated, but the said sleeve is capable of longitudinal movement on the spindle.

A spiral spring 23 encircles the spindle 10 and is located between the collar 12 and the lower end of the sleeve 14. A lever 24 is pivoted adjacent to the governor and is designed to control the motor, the said lever being provided with a brake pad 25 which coacts with the brake disc 15 when the motor exceeds a predetermined speed.

When the governor is in use and rotary motion is applied, through a worm wheel meshing with the worm 11, to the spindle 10 then the sleeve 14 is rotated and a centrifugal force is applied to the balls 19 causing the same to fly outwardly, thereby moving the sleeve 14 longitudinally on the spindle 10 and thus bringing the disc 15 nearer to the brake pad 25 of the lever 24. Should the speed of the motor exceed a predetermined limit, the disc 15 will actually contact with the brake pad 25 and cause a retarding or stopping action on the motor through suitable connections.

When the speed of the motor falls below the maximum speed, then the spring 23 exerts a force on the sleeve 14 moving the same longitudinally on the spindle 10 and so disengaging the disc 15 from the brake pad 25 of the lever 24.

From this description it will be seen that the action of the governor is extremely simple and the several parts of the governor are all exposed so that they can be readily inspected. Moreover, there are no parts of the governor likely to get out of order.

As many changes could be made in the above construction and many widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A governor comprising a spindle formed with a worm on its lower end and provided with a longitudinally extending slot towards the upper end, a collar on said spindle, a set screw for said collar, a sleeve provided at its upper end with a brake disc mounted on said spindle, a set screw for said sleeve adapted to engage with the longitudinaly extending slot in the spindle, a collar on said sleeve intermediate of the length thereof provided with lugs on opposite sides, arms hinged at one end to said lugs and connected to balls at the other end, said balls being also longitudinally connected to the spindle and collar, and a spiral spring between the said collar and the sleeve on said spindle.

In witness whereof I have hereunto set my hand in the presence of two witnesses.

LEOPOLD OTTO CHRISTMANN.

Witnesses:
 ARCHIE WILLIAM CAMERON,
 FESHERS LOUISE WEEDMARK.